HAYDN M. BAKER, OF NEW YORK, N. Y.

Letters Patent No. 84,250, dated November 24, 1868.

IMPROVEMENT IN THE MANUFACTURE OF CARBONATE OF SODA.

The Schedule referred to in these Letters Patent and making part of the same.

*To all whom it may concern:*

Be it known that I, HAYDN M. BAKER, of the city, county, and State of New York, have invented a new and useful Process for the Manufacture of Carbonate of Soda from soluble silicate of soda, which, I verily believe, has not before been known or used; and I hereby declare that the following is a full and exact description thereof.

The nature of my invention consists in decomposing a solution of silicate of soda with one equivalent of bicarbonate of soda to each equivalent of soda (oxide of sodium) contained in the solution of silicate of soda.

It furthermore consists in adding the bicarbonate to the silicate solution in the dry state, *i. e.*, bicarbonate of soda containing one equivalent of water, without which it cannot exist.

The mixture is now to be evaporated to dryness, and the whole submitted to gentle incineration, to render the silica (silicic acid) insoluble. If the whole mass be now immersed in boiling water, two equivalents of carbonate of soda dissolve out, and the anhydrous silica remains undissolved.

The solution of carbonate of soda may now be evaporated to dryness, and one half of it sent to market, and the other half saturated with carbonic acid, to form bicarbonate of soda, for the purpose of decomposing new quantities of silicate of soda.

The silica is chemically pure, or nearly so, and may be used by glass-makers for the formation of "best flint glass."

The advantage of this invention is, that it affords an economical method of manufacturing pure carbonate of soda and silica, (silicic acid,) and thereby enables glass-manufacturers to employ pure materials for the fabrication of their wares, at a moderate cost, and to produce goods of very much more desirable quality.

What I claim as my invention, and desire to secure by Letters Patent, is—

The use of bicarbonate of soda for the purpose of decomposing soluble silicate of soda, to produce pure carbonate of soda and silica (silicic acid.)

HAYDN M. BAKER.

Witnesses:
JOHN L. BROWER,
H. CHAMBERS.